Oct. 6, 1970 F. O. HESS Re. 26,960

METAL HEATING

Original Filed Aug. 1, 1966

INVENTOR.
FREDERIC O. HESS

BY F. O. Hess

ATTORNEY.

United States Patent Office

Re. 26,960
Reissued Oct. 6, 1970

26,960
METAL HEATING

Frederic O. Hess, Skytop, Pa., assignor to Selas Corporation of America, Dresher, Pa., a corporation of Pennsylvania Original No. 3,345,846, dated Oct. 10, 1967, Ser. No. 569,340, Aug. 1, 1966. Application for reissue Apr. 29, 1969, Ser. No. 835,852
Int. Cl. B21d *31/00, 37/16;* C21d *1/74, 1/06;* F27d *7/00*
U.S. Cl. 72—200 8 Claims

Matter enclosed in heavy brackets [ ] appears in the original patent but forms no part of this reissue specification; matter printed in italics indicates the additions made by reissue.

*ABSTRACT OF THE DISCLOSURE*

*A process of heating metals without scaling by heating with a stoichiometric mixture of fuel and combustion supporting gas until the metal reaches scaling temperature, then changing to a rich mixture and continuing the heating until the metal reaches the desired temperature.*

*Summary of the invention*

Figure 2:
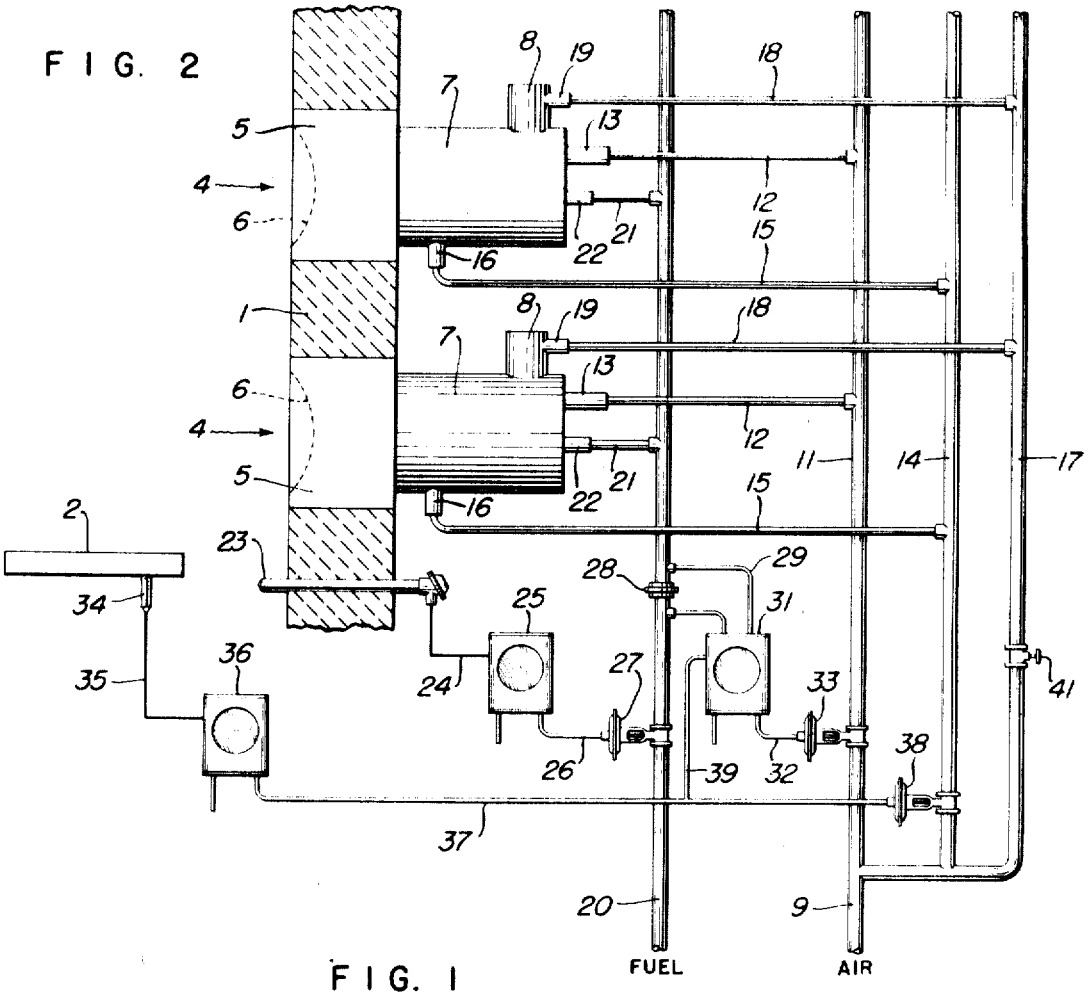

The present invention relates to the heating of metals and more partciularly to the scale-free heating of metals for hot forming or other purposes.

Ordinarily in the heating of steel billets for rolling, for example, the surface of the metal becomes heavily oxidized or covered with scale which must be removed before the metal is formed. The scale has an insulating effect which increases the time of heating. More importantly, however, the scale represents a substantial metal loss. In addition, any billet that has surface defects before heating, such as cracks, must be scrapped since the surfaces of the defect also become oxidized below the surface of the billet and are rolled or hammered into the final shape.

It is an object of the invention to provide a method of heating metal which normally oxidizes at elevated temperatures in such a manner that its surface is clean when the heating is completed.

It is a further object of the invention to provide a method of heating metals so that surface defects are kept clean or cleaned to such an extent that they are repaired during subsequent hot forming.

In practicing the invention, the metal is heated in a furnace that is directly fired by burners using a substantially stoichiometric mixture of fuel gas and *a combustion supporting gas containing oxygen which is usually air and will be so referred to herein* [air] until the work reaches a temperature where its surface is about to oxidize. At that time the fuel ratio is changed to a rich mixture so that the products of combustion are reducing or, in any event, non-oxidizing. The heating is continued under these conditions until the work is brought up to the desired temperature.

The invention is applicable to the heating of any metal. It is particularly useful, however, in the heating of metals which oxidize at elevated temperatures such as steel or copper, for example.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrtaed and described a preferred embodiment of the invention.

Figure 1:
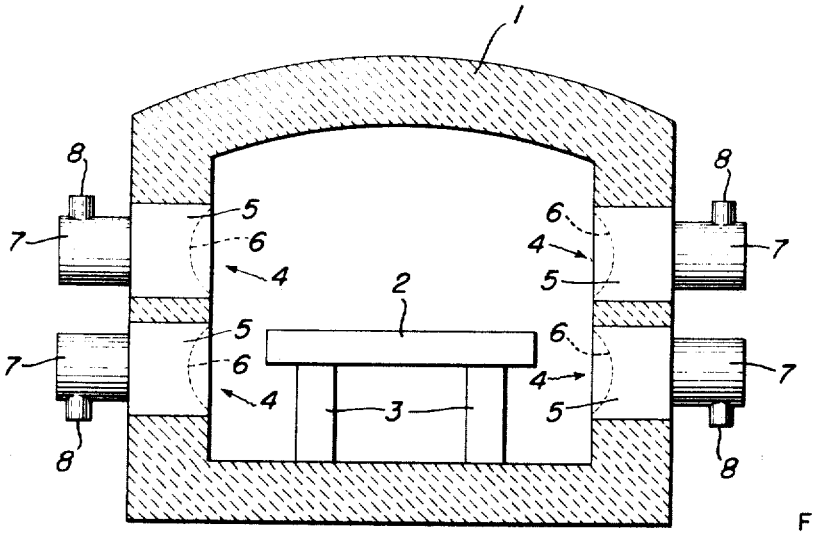

In the drawings:

FIG. 1 is a section through a furnace of a type which can be used for the invention, and FIG. 2 is a diagram showing the supplies of fuel and air and the controls for these supplies by which the invention can be carried out.

*Detailed description*

Referring to FIG. 1, there is shown a furnace 1 in which a slab, billet or other metal piece 2 is to be heated to hot working temperature. The work piece is mounted on supports 3 so that the hot gases of the furnace can circulate around it in order to heat it evenly. The furnace is heated by a plurality of burners 4 which fire directly into the furnace chamber and around the work. These burners are of a type shown in Pat. No. 3,262,484 and the disclosure thereof is incorporated herein by reference.

The burners, as shown in FIG. 2, include a refractory block 5 that forms a portion of the furnace wall with each block being provided with a cup-shaped depression 6 in the face thereof into which fuel gas and *combustion supporting gas, usually* air, are discharged for burning. Attached to the rear of the burners and to the furnace wall is a chamber 7 in which are located the supply pipes for fuel and air and through which furnace gases are drawn directly from the furnace chamber to preheat the air supply. The chamber is provided with a vent 8 through which these gases are exhausted.

In the system there is provided a main air supply 9 with several branches. One of these branches, 11, is connected to supply primary air to each of the burners of the furnace, two of which are shown in FIG. 2 of the drawing. Air flows from pipe 11 through branches 12 to the inlet pipe 13 of each burner. A secondary air line 14, also supplied by the main air supply 9, is connected with each of the burners through branches 15 that connect with secondary air pipe 16 of the burners. A third air supply line, called the ejector air and indicated at 17, is used to supply air to a pipe 19 in vent 8 to aspirate the furnace gases from the furnace chamber through burner chamber 7 to the atmosphere. A gas supply pipe 20 leading to all of the burners has a branch 21 to each burner, which branch is connected to a fuel supply pipe 22 of the individual burners.

The temperature of the interior of the furnace is measured by a thermocouple 23, or other suitable temperature sensing device, which is connected by a lead 24 with a standard temperature controller 25. This controller and the other controllers, to be described below, are preferably of the pneumatic contol type and operate in a well known manner to vary a control air output proportionately with changes in temperature or other variables being measured. In this case the control pressure from instrument 25 is applied through a control line 26 to a pneumatically operated valve 27 in the gas supply line. In operation, the temperature of the furnace is used to control the supply of fuel and the supply of fuel is used to control the amount of air. To this end, there is provided an orifice 28 in the fuel line downstream of control valve 27. The differential pressure across this orifice is applied to a standard ratio control instrument which may well be a controlling flow meter with an adjustable control point setting. Variations into the flow of the gas acting on this instrument produce a variable control pressure that is applied through a line 32 to a pneumatically operated valve 33 in the primary air supply line 11. Thus, as the fuel supply is varied in order to maintain the furnace temperature at the desired value, the air supply is also varied to maintain the proper ratio of fuel and air.

The temperature of the work is used, as it increases, to vary the ratio of fuel to air that is supplied to the burners. To this end, the temperature of the work is measured by a thermocouple 34 or other suitable temperature responsive element which is connected by leads 35 to a pneumatic control instrument 36. As the temperature response of measuring element 34 varies, control instrument 36 will produce a variable control pressure which is applied through control line 37 to a pneumatic control valve 38 located in secondary air supply line 14. A branch of line 37, indicated at 39, also permits this control pressure to be applied to the ratio adjusting mechanism of controller 31. The ejector air supply, which is normally constant, can be regulated by a manually operated valve 41 that is located in the ejector air supply line 17.

In practicing the invention, prior to the time a piece of work is placed in the furnace, control instrument 31 is adjusted so that the proper ratio of fuel and air will be supplied to the burners. The burners are then ignited and the furnace is heated by radiation from the burner cups and the products of combustion. The furnace is maintained at the desired temperature, as measured by the temperature responsive element 23, by control instruments 25 and 31, adjusting valves 27 and 33 respectively. Ordinarily if the work is to be heated for rolling or forging the furnace temperature will be about 2400° F. or higher. The *combustion supporting gas-fuel gas* [air-gas] ratio will be maintained at substantially stoichiometric, which for *air and* natural gas will be about 9.6 to 1. The products of combustion for this fuel-air ratio are oxidizing to steel above about 1400° F.

During the operation of the furnace, products of combustion are being drawn back through chamber 7 of the burners by the aspirating effect of the ejector air in vent 8. These combustion products serve to preheat air flowing to the burner as disclosed in said Pat. 3,262,484.

The work is placed in the furnace to be heated. Because of the high temperature of the furnace and the fact that products of combustion can circulate freely around most of the work surface, heating of the work will take place rapidly. At the fuel-air ratio mentioned, the furnace gases will not be oxidizing to the work until it reaches 1400°–1500° F. When the work reaches about 1400° F., as measured by elements 34, controller 36 will produce a control pressure in line 37, opening valve 38 and operating to adjust instrument 31 to change the air-gas ratio from stoichiometric to a rich mixture in which there is at least a 30% deficiency of air. Preferably the air-gas ratio will be about 5 to 1. This cuts down the primary combustion air to about 53% of stoichiometric, the remaining 47% deficiency being supplied through pipes 14 and 15 as secondary air. The unburned gas in the rich mixture of products of combustion being drawn through the chambers 7 of the burners, mixes with the secondary air supplied to said chambers to burn therein. Ordinarily natural gas will not burn with an air-gas ratio of 5 to 1 unless the air is preheated to at least 1000° F. Burning of the secondary air and raw gas of the exhaust gases in chamber 7 will preheat the primary air to above 1000° F. so that the rich mixture supplied to the burners will burn at a high temperature in the furnace chamber, with the products of combustion being in direct contact with the work.

Valve 38 can be adjusted to open and instrument 31 can be adjusted to shift the gas-air ratio when the work reaches 1400° F. as mentioned, or the valve can be adjusted to open gradually and the instrument adjusted to shift ratio gradually as the work temperature varies through a range of temperature, say from 1300° F. to 1500° F. if desired. Adjustments of this type are conventional in pneumatic control instruments.

After the ratio adjustment has taken place, the heating of the work will continue in the fuel-rich furnace atmosphere. This atmosphere is reducing and will not only prevent any oxidation of the work from taking place but will reduce any slight oxide that may have been formed while the metal continues to be heated to above a hot working temperature of 2250° to 2300° F. Thus, when the work is heated it has a clean surface and may be moved directly from the furnace to a rolling mill or forge, for example, without the delay ordinarily required for descaling and cleaning and loss of heat which occurs during that time.

When a slab, for example, with surface defects such as cracks is heated as described above, the atmosphere of the furnace chamber will not only keep the surface of the slab clean, it apparently also cleans the surfaces of the cracks. Thereafter, when the slab is hot worked, such as being rolled, the surfaces of the cracks will weld together so that the resulting strip is perfect. This surface welding under pressure is only possible because of the manner in which the heating takes place.

While the invention is particularly useful in the heating of steel, it is equally as useful in the heating of any metal that oxidizes during normal heating for hot working. It is necessary to determine the temperature at which the metal will begin to oxidize, and at that temperature of the metal set the controls to adjust the ratio controller to reduce the supply of primary air and start the secondary air supply to the burner chambers. In the heating of copper, for example, controller 36 is adjusted to apply a ratio adjusting pressure to ratio controller 31 and open valve 38 when the metal has reached a temperature of about 600° F. Thereafter the metal is heated in a non-oxidizing atmosphere as it is raised to a hot working temperature of about 1650° F.

From the above it will be seen that there is provided a method for the rapid, scale-free heating of metals which oxidize at elevated temperatures. By surrounding substantially the entire surface of the metal object with high temperature products of combustion in a furnace at an elevated temperature, and regulating the analysis of these products of combustion as the metal temperature increases not only heats the metal rapidly, but also permits defects to be cured during subsequent treatment.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of heating a metal which oxidizes at elevated temperatures which comprises heating the metal in direct contact with products of combustion resulting from burning a substantially stoichiometric mixture of fuel gas and air in the presence of the metal until the metal has reached a temperature at which its surface will begin to oxidize in the presence of said products of combustion, then continuing the heating of the metal in direct contact with products of combustion resulting from burning, in the presence of the metal, a rich mixture of fuel gas and air having at least a 40% deficiency of air from said first mentioned temperature to the hot working temperature for said metal.

2. The method of claim 1 in which the fuel gas is natural gas and the first mentioned air-gas ratio is about 9.6 to 1 and in which the air-gas ratio of the rich mixture is about 5 to 1.

3. The method of heating without scaling a material that oxidizes at elevated temperatures which comprises placing the material in the combustion zone of a direct fired furnace having burners in the wall thereof, supplying fuel gas and air to the burners, regulating said supplies to substantially stoichiometric proportions, burning the fuel and air to heat the material to a temperature where surface oxidation will begin to take place, changing the fuel-air ratio to the burners so that there is at least a 40% deficiency of air, thereby creating a reducing atmosphere, and continuing to heat the material in said reducing atmosphere until the material has reached the final desired temperature.

4. The method of claim 3 in which the air is used for combustion is preheated to at least 1000° F. when the fuel-air ratio is changed to give a deficiency of air.

5. The method of claim 3 in which the material being heated is steel and in which the steel is heated to about 1400° F. before the fuel-air ratio is changed to produce a reducing atmosphere, and continuing the heating of the steel until it reaches a temperature of about 2250° F.

6. The method of claim 3 in which the material being heated is copper and in which the copper is heated to about 600° F. before the fuel-air ratio is changed to produce a reducing atmosphere, and continuing the heating of the copper until it has reached a temperature of about 1650° F.

7. The method of claim 3 in which the material being heated is a steel slab having a crack on its surface, cleaning the surfaces of the crack by the reducing atmosphere while the slab is being heated to the final desired temperature, which is rolling temperature, and rolling the slab thereby welding the surfaces of the crack together.

*8. The method of heating a metal which oxidizes at elevated temperatures which compirses heating the metal in direct contact with products of combustion resulting from burning a substantially stoichiometric mixture of a fuel and a combustion supporting gas in the presence of the metal to produce hot products of combustion that are oxidizing to the metal at temperatures above about 1300° F., continuing heating the metal in said products of combustion until the metal surface reaches substantially oxidizing temperature, changing the ratio of the fuel and combustion supporting gas so that there is at least a 30%*

*deficiency of the combustion supporting gas so that the products of combustion are reducing to the metal, and continuing to heat the metal in the presence of the reducing products of combustion until it reaches the hot working temperature.*

References Cited

The following references, cited by the Examiner, are of record in the patented file of this patent or the original patent.

UNITED STATES PATENTS

| | | | |
|---|---|---|---|
| 2,587,900 | 3/1952 | Robiette | 148—16.7 |
| 2,763,476 | 9/1956 | Ness et al. | 263—15 |
| 2,886,303 | 5/1959 | Rusciano | 263—15 |
| 3,331,594 | 7/1967 | Davies | 148—16.7 |
| 2,799,491 | 7/1957 | Rusciano | 266—5 |
| 2,844,365 | 7/1958 | Rusciano | 266—5 |
| 2,845,260 | 7/1958 | Rusciano | 263—15 |
| 2,848,207 | 8/1958 | Rusciano | 263—15 |
| 3,022,057 | 2/1962 | Schmidt et al. | 263—15 |
| 3,125,327 | 3/1964 | Williams | 263—15 |
| 3,159,387 | 12/1964 | Campbell et al. | 263—40 |
| 3,170,681 | 2/1965 | Davies | 263—40 |

FOREIGN PATENTS

| | | |
|---|---|---|
| 697,734 | 9/1953 | Great Britain. |

CHARLES W. LANHAM, Primary Examiner

E. M. COMBS, Assistant Examiner

U.S. Cl. X.R.

72—342, 364; 148—132, 167, 203; 263—15, 40; 266—5